United States Patent [19]

Fields

[11] 3,818,041

[45] June 18, 1974

[54] PROCESS FOR PREPARING AROMATIC CYCLIC THIONES
[75] Inventor: Ellis K. Fields, Chicago, Ill.
[73] Assignee: Standard Oil Company, Chicago, Ill.
[22] Filed: Oct. 24, 1972
[21] Appl. No.: 300,188

Related U.S. Application Data
[63] Continuation of Ser. No. 856,843, Sept. 10, 1969.

[52] U.S. Cl. .... 260/327 C, 260/327 M, 260/668 R, 424/277, 252/45
[51] Int. Cl............................................ C07d 71/00
[58] Field of Search .................... 260/327 M, 327 C Primary Examiner—Henry R. Jiles
Assistant Examiner—Cecilia M. S. Jaisle
Attorney, Agent, or Firm—Gunar J. Blumberg; Arthur G. Gilkes; William T. McClain

[57] ABSTRACT

Aromatic cyclic thiones are synthesized and a process for preparing them by the thermal conversion of aromatic carboxylic acid anhydride to its aryne form and reaction therewith of carbon disulfide is described. The products are useful as bactericides and as extreme-pressure additives in lubricating compositions.

6 Claims, No Drawings

A PROCESS FOR PREPARING AROMATIC CYCLIC THIONES

This is a continuation of application Ser. No. 856,843, filed Sept. 10, 1969.

This invention relates to a new class of compounds and to a method suitable for their preparation as well as for the simultaneous preparation of related but known compounds. More particularly, in its compositional aspect, it relates to aromatic cyclic trithiocarbonates.

The existence of the unstable intermediate benzyne and its role in the mechanism of nucleophilic substition reactions are known to the prior art. Benzyne is also known as cyclohexadienyne. For purposes of this invention the term "aryne intermediate" will be used to indicate any aromatic ring compound whether mononuclear or polynuclear, fused or unfused but wherein a single ring in such compound is a cyclohexadienyne. Benzyne will refer to the specific case where the starting material is the unsubstituted benzene ring. Prior art techniques for the generation of benzyne are perhaps best illustrated by the so-called Wittig method, wherein the starting material representing the precursor compound for the benzyne is, for example, o-fluorobromobenzene. This precursor, dissolved in a suitable solvent, is contacted with magnesium turnings. The bath within which the reaction is conducted is maintained at relatively low temperatures. This common technique is in sharp contrast to that of the present invention which avoids such reactive substances as solvent and is conducted at relatively high temperatures. These conditions result in the stripping-off of the substituents from the benzene nucleus by heterolytic cleavage whereby the remaining unpaired electrons enter into covalent bonding, forming the triple bond which is characteristic of the benzyne form. More particularly, reactions have been conducted wherein the benzyne form has been used as a coreactant with carbon disulfide. However, these reactions have also been carried out in the liquid phase thus introducing reactive materials. In Tetrahedron Letters No. 39: 3829—3829 (1967), Kabushi and co-workers dissolved metallic sodium in a reaction vessel containing liquid ammonia, added carbon disulfide thereto, and then charged the vessel with bromobenzene. This reaction yielded a variety of products. Some were nitrogen-containing compounds resulting from the interaction of the starting materials with the reaction medium. The sulfur-containing compounds that were formed consisted of thioanisole, thiophenol, and diphenyl sulfide, none of which are aromatic cyclic thiones, within which class are found the compounds of this invention, viz.-the aromatic cyclic trithiocarbonates.

It has now been discovered that a class of novel compounds known as aromatic cyclic trithiocarbonates can be synthesized. These compounds are useful as bactericides and extreme-pressure additives in lubricating compounds.

The novel process by which they are prepared yields, as a co-product, a related but known class of aromatic cyclic thione, namely, dithiole-thiones. This process is characterized by the thermal conversion of an aromatic anhydride to its aryne form by thermal cleavage of the anhydride moiety. Carbon disulfide, as the substantially sole reactive entity, reacts with the aryne intermediate to form a mixture of aromatic cyclic thiones. The process thus utilizes available, low-cost starting material, effects an easy synthesis and results in a product mixture substantially free of unwanted by-products; all of which objects are not fully attainable by the prior art techniques.

The novel compounds of this invention are aromatic cyclic trithiocarbonates having the following general structure:

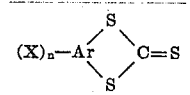

wherein X is selected from the group consisting of halogen, cyano, carboxyl, phenyl and alkoxy carbonyl; and wherein n is an integer from 0 to the number of replaceable ring-hydrogen atoms present in the Ar structure; and wherein Ar is an aromatic radical.

The selection of aromatic dicarboxylic acid anhydrides that may be used in the process of this invention is limited only by their ability to withstand the elevated temperatures of the process. Suitable aromatic anhydrides have the following general structure:

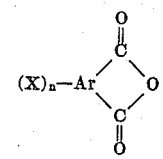

X can be halogen, cyano, carboxyl, phenyl and alkoxy carbonyl; n can be an integer from 0 to the number of replaceable ring-hydrogens present in the Ar structure. The aromatic nucleus can be that of benzene, fused-ring aromatic compounds, or polyphenylene compounds wherein the rings are covalently bonded through ring carbon atoms or linking radicals such as -O-, -S-, -CO-, -CS-, -SO$_2$- and the like. Typical of the aromatic anhydrides that may be used are phthalic anhydride, 4-chlorophthalic anhydride, tetrachlorophthalic anhydride, tetraphenylphthalic anhydride, trimellitic anhydride, 1,8-naphthalic anhydride, and 2,3-naphthalic anhydride, 1,2-anthracene dicarboxylic acid anhydride, 2,3-phenanthrene dicarboxylic acid anhydride, and biphenyl-3,4-dicarboxylic acid anhydride. Although a large number of aromatic nuclei may be used the preferred radicals are those of benzene and napthalene with the benzene being the most preferred.

Standard reagent-grade carbon disulfide may suitably be used in the process. The aromatic anhydride and the carbon disulfide are intended to be the sole reactive starting materials in the process of this invention, since one of its objects is to yield a product mixture consisting almost solely of aromatic cyclic thiones. The unwanted byproducts of the prior art techniques resulting from interaction of starting materials with the medium are thus avoided.

The object of the conversion step is to generate the aryne form of the starting aromatic anhydride. In my process, the anhydride moiety is cleaved from the aromatic nucleus thermally. Although the threshold temperature for this cleavage reaction is, of course, dependent upon the initial selection of the aromatic anhydride, I have found, for example, that phthalic anhydride can be pyrolyzed to its benzyne form by the stripping-off of the anhydride moiety at a temperature of about 625°C. ("Pyrolyzed" in the sense used here means cleaving-off the anhydride moiety without completely decomposing the ring structure "carrying" the moiety.) I have found that a range of temperatures which is advantageous for this conversion step is from about 625°C. to about 800°C. The lower temperature is the threshold temperature for the cleavage of the anhydride moiety whereas temperatures in excess of the threshold temperature are used merely to kinetically enhance the step. The upper limit of temperature that is permissible is dependent on the thermal stability of the starting anhydride and, correspondingly, the thermal stability of its aryne form. This upper limit can easily be discovered by persons skilled in the art. From a practical point of view, temperatures in excess of 800°C. are not particularly suitable, for two reasons. First, the rate of reaction above 800°C. is not significantly accelerated and secondly, the possibility of thermal degradation is, of course, increased at these high temperatures. I prefer to carry out this conversion step at temperatures between about 650°C. to about 725°C. Consistent with the object of avoiding unwanted by-products in this process, the conversion step should be conducted in an inert atmosphere. Any gaseous environment that is inert to the reactants under the conditions of the conversion anhydride, suitable, for example, carbon dioxide could be used. However, nitrogen is the preferred inert atmosphere.

The second step of my process consists of reacting the aryne intermediate with carbon disulfide. The reaction, using benzyne as illustrative of the aryne intermediate, is as follows:

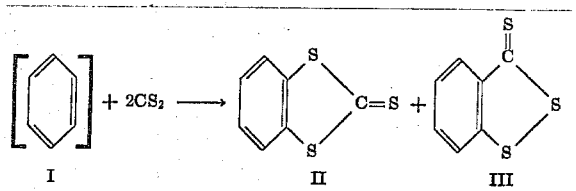

I Benzyne
II A Thiocarbonate
III A Cyclic Dithiole-Thione

This reaction is carried out under the same conditions as the conversion step. Where the process is to be conducted as a two-stage, sequential operation, it is possible to cool the aryne intermediate effluent from the conversion step down to about the threshold temperature for aryne generation prior to the reaction. Cooling below the threshold temperature of the anhydride could result in autoreactions of the aryne species and the formation of unwanted polyphenyl compounds. Practically speaking, however, this would not be done. In view of the short duration required of the process, rapid heat removal would be difficult.

The duration of the reaction step is dictated, like the conversion step, by considerations of kinetics and thermal degradation. In general, the time should be sufficient for the reaction to take place but should be less than that time within which the aromatic cyclic thione products are completely decomposed. Advantageously, reaction times from about 0.1 to about 10 minutes may be used; preferred times are from about 0.3 to about 1 minute.

Although the process may be carried out sequentially, in fact, it has been found most convenient to accomplish both steps simultaneously. In this mode of operation of the process the aromatic anhydride and the carbon disulfide are brought into contact with each other and then subjected to a single time-temperature regime in a single zone. For example the entire process would be run at between about 625°C to about 800°C for total times ranging from about 0.1 to about 10 minutes. The method of bringing the anhydride and the carbon disulfide together prior to the simultaneous process steps is not critical. For example, the aromatic anhydride could be dissolved in the liquid carbon disulfide. This mixture could then be introduced into the conversion zone of the process vessel and both reactants vaporized concurrently and in intimate admixture with each other. An equally suitable method would be to vaporize the two reactants separately. For example, the aromatic anhydride could be pyrolyzed and the resulting gaseous aryne form carried into the reaction zone; the carbon disulfide could be separately vaporized and then mixed with the gaseous aryne intermediate.

The aromatic anhydride and the carbon disulfide can be charged to the system over a wide range of mole ratios. I have found that the mole ratio of the aromatic anhydride and carbon disulfide may vary from about 1:1 to about 1:100; with the preferred range being 1:5 to about 1:25. Above the preferred limit of 1:25, the stoichiometry is simply inefficient with excess carbon disulfide acting as a diluent and not participating in the reaction. Below the preferred range of 1:5, the enriched concentration of the aryne intermediate tends to promote interaction between such aryne species resulting in the unwanted polyphenyl products.

The products of this process are substantially a mixture of aromatic cyclic thiones (a "thione" for the purpose of this invention is defined as any compound containing the thioxo radical,

regardless of the type of atoms linked thereto). In addition to the instantly discovered aromatic cyclic trithiocarbonates described hereinbefore, another type of product is produced, viz. - the aromatic cyclic dithiole-thiones having the general structure of

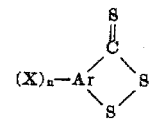

wherein X can be halogen, cyano, carboxyl, phenyl and alkoxy carbonyl and n is an integer from 0 to the number of replaceable ring-hydrogens present in the Ar structure, and where Ar is the aromatic nucleus of any suitable aromatic dicarboxylic acid anhydride selected as a starting material.

Separation of these isomers can be conventionally accomplished by any convenient method, such as, extraction-distillation, crystallization or chromotography.

To evaluate the usefulness of the compounds of this invention for bactericide applications, a simple test was devised. A bacterial culture media was first prepared of agar paste containing 2 percent dextrose and 1 percent gelatin. This paste was deposited on standard laboratory petri dishes. The plates were allowed to stand open to the air. A control plate contained no active ingredient. After standing for 48 hours, the control plate was observed to have supported abundant growth of adventitious bacteria. (This term, "adventitious," is commonly used by those skilled in the art to connote microorganisms which are produced in a non-indigenous or synthetic media). Additionally, it appeared that a multitude of bacterial species were present on the control plate. Experimental plates were likewise prepared containing the compounds of this invention. The experimental compounds were a mixture of cyclic thiones which were first dissolved in benzene at a concentration of 0.01 wt. percent. (1) part of this solution were then mixed with (10) parts of the agar paste and (3) parts of the thus prepared experimental paste were deposited on a petri dish. The results of this testing are discussed in the appropriate examples. The following examples illustrate the present invention, but in no way are intended to limit its scope.

EXAMPLE 1

A solution of 14.8 gm. (0.1 mole) of phthalic anhydride in 90.6 ml (1.5 mole) of carbon disulfide was pumped into a Vycor tube filled with Vycor chips at 700°C. under nitrogen flowing at 10 cc/min. Contact time was 23 seconds. The effluent was condensed in bulbs at −60°C. It was extracted with 5 percent aqueous sodium hydroxide, which removed 9 gms of unreacted phthalic anhydride, and distilled to recover 82 ml of carbon disulfide. The residue weighed 6.2 gm. This residue was analyzed by mass spectrometry with a GEC Model 21-103 (70 and 7.5 nominal ionized volts with source and inlet at 250°C.) The residue was further analyzed by gas chromatography and directly-coupled gas chromatography-mass spectrometry. The major product in the residue was determined by mass spectrometry to have a molecular weight of 184. It was also observed that this product had an isotopic profile corresponding to three sulfur atoms, thus having the empirical formula $C_7H_4S_3$. The residue was then separated by preparative gas chromatography into two compounds that eluted near each other and had close boiling points. One portion of 1.65 gms was identified by elemental, mass-spectral, and n.m.r. analyses to be dithiocatechol trithiocarbonate, a red compound, melting at 140°C. Its yield was calculated as 22 mole percent. The second product of 2.52 gm was positively identified as benzotrithione (benzo-1,2 dithiole-3-thione) by gas chromatography, ultra-violet and mass spectrum, all of which characterizations were identical to those of an authentic sample. The product was further characterized as having a melting point of 90°C.

A bacterial test plate was prepared as hereinbefore described containing a mixture of the aromatic cyclic thione product. After 168 hours, the plate was examined and found to have completely inhibited all bacterial growth.

EXAMPLE 2

A solution of 19.2 gm (0.1 mole) of 4-carboxy phthalic anhydride, (trimellitic anhydride) in 90.6 ml of carbon disulfide was pumped into a Vycor tube filled with Vycor chips. Temperature, nitrogen flow rate, and contact time were identical with the conditions of Example No. 1. Product recovery was carried out as in Example No. 1. The recovered residue weighed 8.4 gm. It was separated by preparative gas chromatography into a 24 mole percent fraction with a molecular weight of 228, a 3-sulfur isotopic profile and a carboxyl group. About 30 weight percent of the residue was found to contain no carboxyl substituent. The fractions were thus identified as a mixture of 4-carboxy dithiocatechol trithiocarbonate, 4-carboxy benzotrithiole (5-carboxybenzo-1,2-dithiole-3-thione) and the 30 percent fraction corresponding to the products of Example 1, presumably by decarboxylation of the primary products.

EXAMPLE 3

A solution of 18.2 gm., 0.1 mole, of 4-chloro phthalic anhydride in 90.6 ml of carbon disulfide was pumped into a Vycor tube filled with Vycor chips. Temperature, nitrogen flow rate, and contact time were identical to the conditions of Examples 1 and 2. The product was recovered by the same technique as used above and the residue, weighing 10.4 gm., consisted of a 31 mole percent fraction of molecular weight 218, containing one chlorine and three sulfur atoms. The fraction was thus identified to be a mixture of 4-chloro dithiocatechol trithiocarbonate and 4-chlorobenzotrithione (5-chlorobenzo-1,2-dithiole-3-thione). A bacterial test plate was prepared containing a mixture of the cyclic thiones of this example. After 168 hours, the plate was observed to have completely inhibited all bacterial growth.

Thus, having described the invention, what I claim is:

1. A process for the preparation of aromatic trithiocarbonates and aromatic cyclic dithiole-thiones, comprising: converting by heating to its aryne form an aromatic dicarboxylic acid anhydride, and reacting at a temperature in the range of about 625°C to about 800°C the aryne intermediate, in the substantial absence of other reactive substances, with carbon disulfide.

2. A process for the preparation of aromatic trithiocarbonates and aromatic cyclic dithiole-thiones, which comprises the steps of:
   a. heating, in an inert atmosphere, an aromatic dicarboxylic acid anhydride at temperatures of about 625°C to about 800°C to convert the anhydride to its aryne - intermediate form; and
   b. reacting, in an inert atmosphere, the aryne - intermediates with carbon disulfide at temperatures of about 625°C to about 800°C, and at a molar ratio of the aryne intermediate to the carbon disulfide of about 1:1 to about 1:100.

3. The process of claim 2 wherein said heating and reacting steps are carried out simultaneously.

4. The process of claim 2 wherein the aromatic dicarboxylic acid anhydride is phthalic anhydride.

5. The process of claim 2 wherein the aromatic dicarboxylic acid anhydride is trimellitic anhydride.

6. The process of claim 2 wherein the aromatic dicarboxylic acid anhydride is 4-chloro-phthalic anhydride.

* * * * *